(12) United States Patent
Harding (10) Patent No.: US 8,967,069 B2
(45) Date of Patent: Mar. 3, 2015

(54) WATER WINGS DEVICE FOR A WATERCRAFT

(76) Inventor: Jonathan Cole Harding, Denver, CO (US)

( * ) Notice: Subject to any disclaimer, the term of this patent is extended or adjusted under 35 U.S.C. 154(b) by 182 days.

(21) Appl. No.: 13/005,615

(22) Filed: Jan. 13, 2011

(65) Prior Publication Data

US 2011/0168076 A1     Jul. 14, 2011

Related U.S. Application Data

(60) Provisional application No. 61/294,608, filed on Jan. 13, 2010.

(51) Int. Cl.
| | | |
|---|---|---|
| *B63B 1/20* | (2006.01) | |
| *B63B 1/00* | (2006.01) | |
| *B63B 1/32* | (2006.01) | |
| *B63H 25/38* | (2006.01) | |
| *B63B 1/08* | (2006.01) | |
| *B63B 39/06* | (2006.01) | |

(52) U.S. Cl.
CPC ............ *B63H 25/382* (2013.01); *B63B 1/08* (2013.01); *B63B 1/32* (2013.01); *B63B 39/062* (2013.01); *Y02T 70/12* (2013.01)
USPC .......................... 114/283; 114/61.29; 114/288

(58) Field of Classification Search
CPC .............. B63B 1/08; B63B 2001/325; B63B 2001/102; B63B 2001/186; B63B 1/283
USPC ................ 114/126, 274, 142, 162, 163, 56.1, 114/61.26, 61.29, 283, 288
See application file for complete search history.

(56) References Cited

U.S. PATENT DOCUMENTS

| | | | | |
|---|---|---|---|---|
| 2,649,266 | A * | 8/1953 | Darrieus ...................... | 244/130 |
| 3,099,239 | A * | 7/1963 | Von Schertel et al. ........ | 114/282 |
| 5,626,669 | A * | 5/1997 | Burg ........................... | 114/67 A |
| 5,701,836 | A * | 12/1997 | Tsui ............................ | 114/67 A |
| 5,954,009 | A * | 9/1999 | Esmiol ......................... | 114/274 |
| 6,716,531 | B2 * | 4/2004 | McKeand .................. | 428/425.8 |
| 7,150,434 | B1 * | 12/2006 | Bandyopadhyay ........... | 244/130 |
| 2011/0094433 | A1 * | 4/2011 | Shoda et al. ................. | 114/330 |

* cited by examiner

*Primary Examiner* — S. Joseph Morano
*Assistant Examiner* — Andrew Polay
(74) *Attorney, Agent, or Firm* — Sheridan Ross P.C.

(57) ABSTRACT

The present invention is a water wings device used in combination with a watercraft that includes a plurality of water wings attached to the sides of the watercraft with attachment arms and directing fins that are placed into the water that the watercraft is traveling in. There is also an embodiment of the water wings device that includes a boat tail with a tapering protrusion that is placed into the water the watercraft is traveling in. Another embodiment is the water tail device that includes a plurality of water tails that attach to the rear of portion of a watercraft used in conjunction with water wings on the side of the watercraft that are all placed into the water the watercraft is traveling in.

11 Claims, 9 Drawing Sheets

WATER WINGS DEVICE FOR A WATERCRAFT

This application claims priority to U.S. Provisional Application 61/294,608 filed on Jan. 13, 2010, the entire disclosure of which is incorporated by reference.

TECHNICAL FIELD & BACKGROUND

The present invention generally relates to a watercraft device. More specifically, the invention is a water wings device for a watercraft.

It is an object of the invention to provide a water wings device for a watercraft that reduces the drag of the watercraft through the water and thereby improves the efficiency of the watercraft.

It is an object of the invention to provide a water wings device that can be attached to the back of a watercraft to destroy a vacuum created as the watercraft travels through the water.

It is an object of the invention to provide a water wings device that can be attached anywhere on a watercraft to separate lower pressure water created by the movement of a watercraft from high pressured water that has not been affected by the movement of the watercraft, thus destroying any formed water vortexes while the watercraft travels.

It is an object of the invention to provide a water wings device for a watercraft that can be affixed to the sides or back of the watercraft.

What is really needed is a water wings device for a watercraft that reduces the drag of the watercraft through the water and thereby improves the efficiency of the watercraft that can be attached to the back of a watercraft to destroy a vacuum created as the watercraft travels through the water. The water wings can also be attached to any part of the watercraft to destroy any water vortexes formed while the watercraft travels and that can be affixed to the sides of the watercraft.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
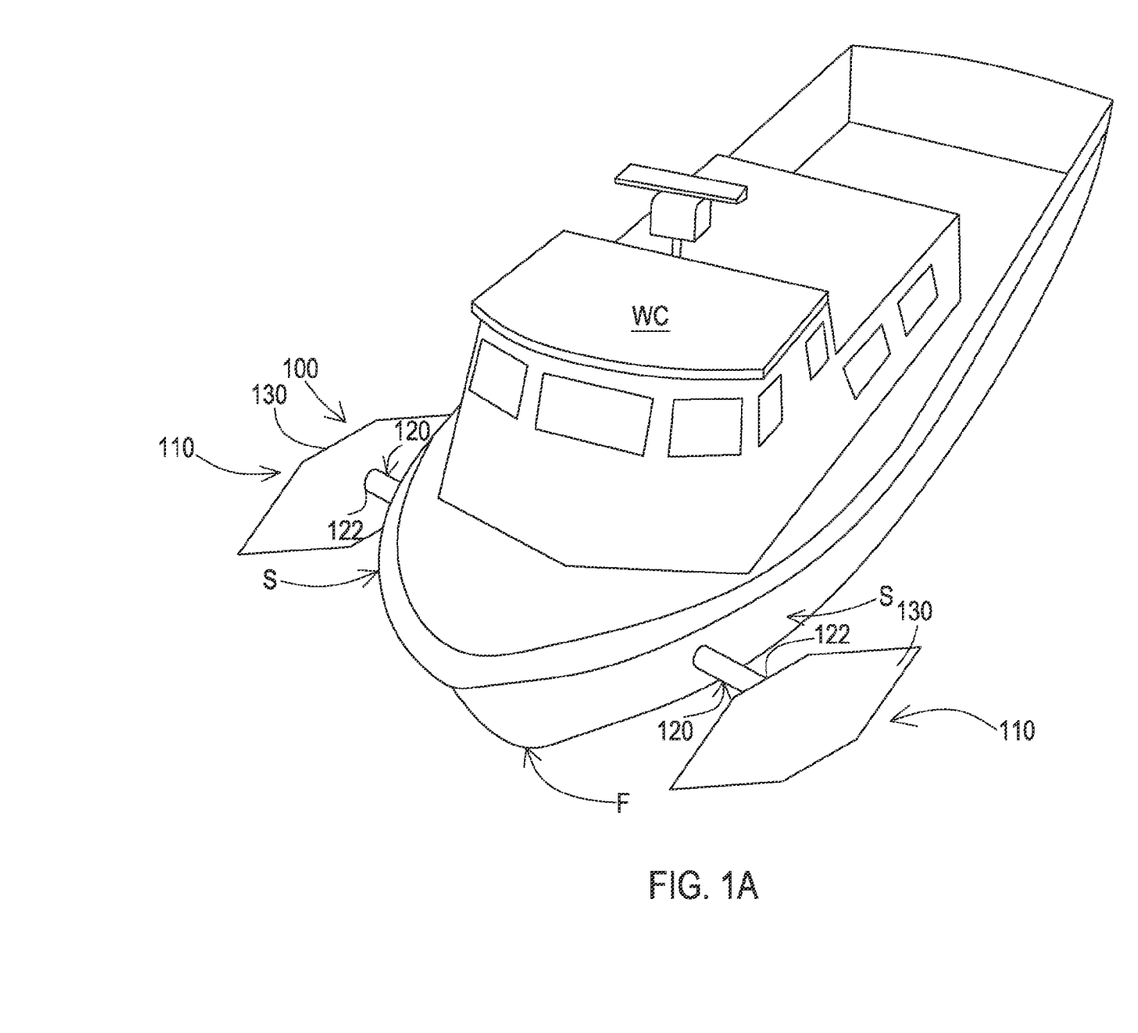
FIG. 1A illustrates a diagonal side overhead perspective view of a water wings device for watercraft attached to each side of a watercraft, in accordance with one embodiment of the present invention.
Figure 1B:
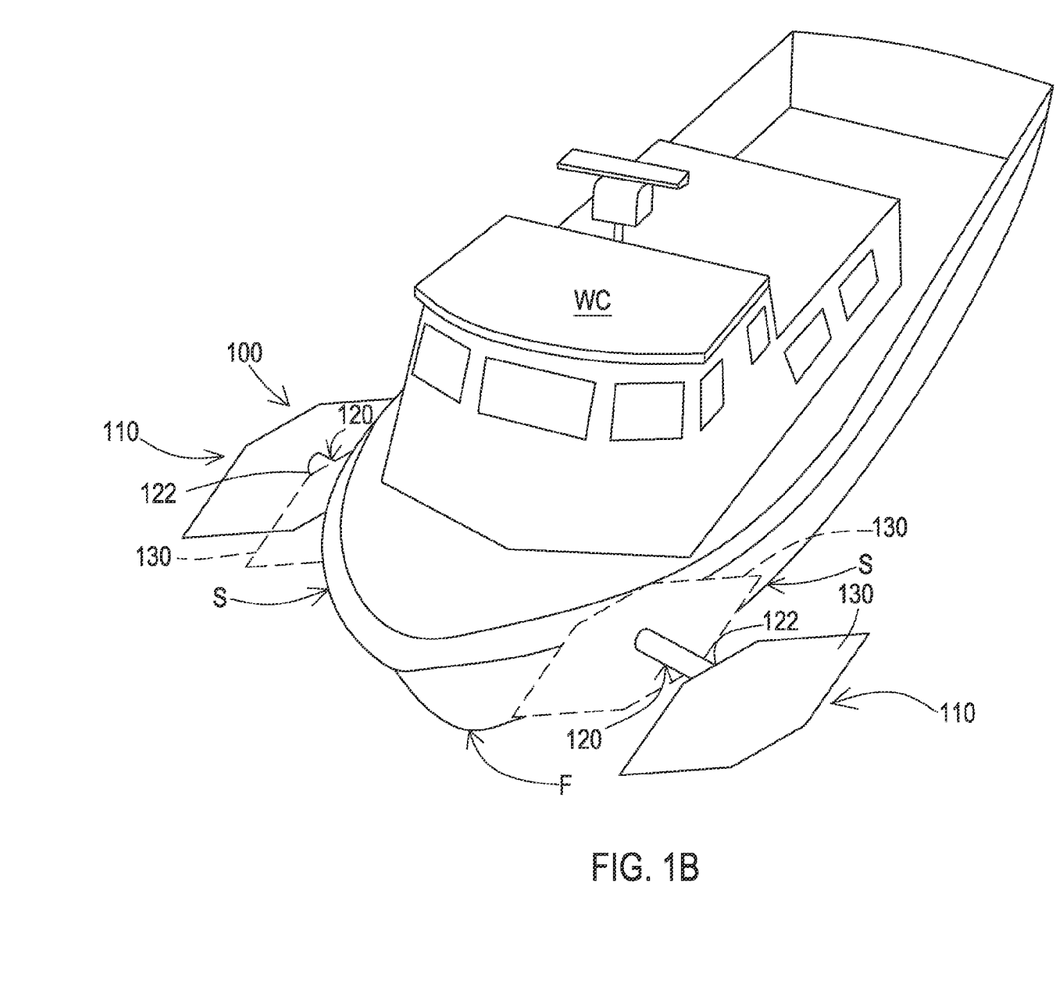
FIG. 1B illustrates a diagonal side overhead perspective view of a water wings device for watercraft attached to each side of a watercraft with water wings extended, in accordance with one embodiment of the present invention.

FIG. 1A illustrates a diagonal side overhead perspective view of a water wings device for watercraft 100 attached to each side S of a watercraft WC, in accordance with one embodiment of the present invention. FIG. 1B illustrates a diagonal side overhead perspective view of a water wings device for watercraft 100 attached to each side S of a watercraft 100 with the water wings 110 extended, in accordance with one embodiment of the present invention.

In one embodiment of the water wings device for watercraft 100, the water wings device for watercraft 100 is attached to the side S of the watercraft WC. The water wings device for watercraft 100 can be attached anywhere along the sides S of the watercraft WC. The water wings device for watercraft 100 includes a water wing 110 on each side of the watercraft WC with an attachment arm 120 that has a directing fin 130 attached to its distal end 122 that directs water in such a methodology that increases the watercraft's WC efficiency while the watercraft WC is traveling through the water. As shown in FIG. 1A, the water wing 110 has a tapered forward edge and a tapered rear edge. The water wing 110 also has a length that is smaller than a length of the watercraft WC. The number of water wings 110 can be any number desired by a user, however only one water wing 110 is provided on each side 122 of the watercraft WC as illustrated in FIGS. 1A and 1B. The attachment arm 120 can be extended as desired by a user, as is illustrated in FIG. 1B or can be stationary, as is illustrated in FIG. 1A. The water wings device for watercraft 100 also is made of material non-corrosive in water. The methodology of the directing fin 130 that increases the watercraft's efficiency is described subsequently after the FIG. 4A and FIG. 4B descriptions.

Figure 2A:
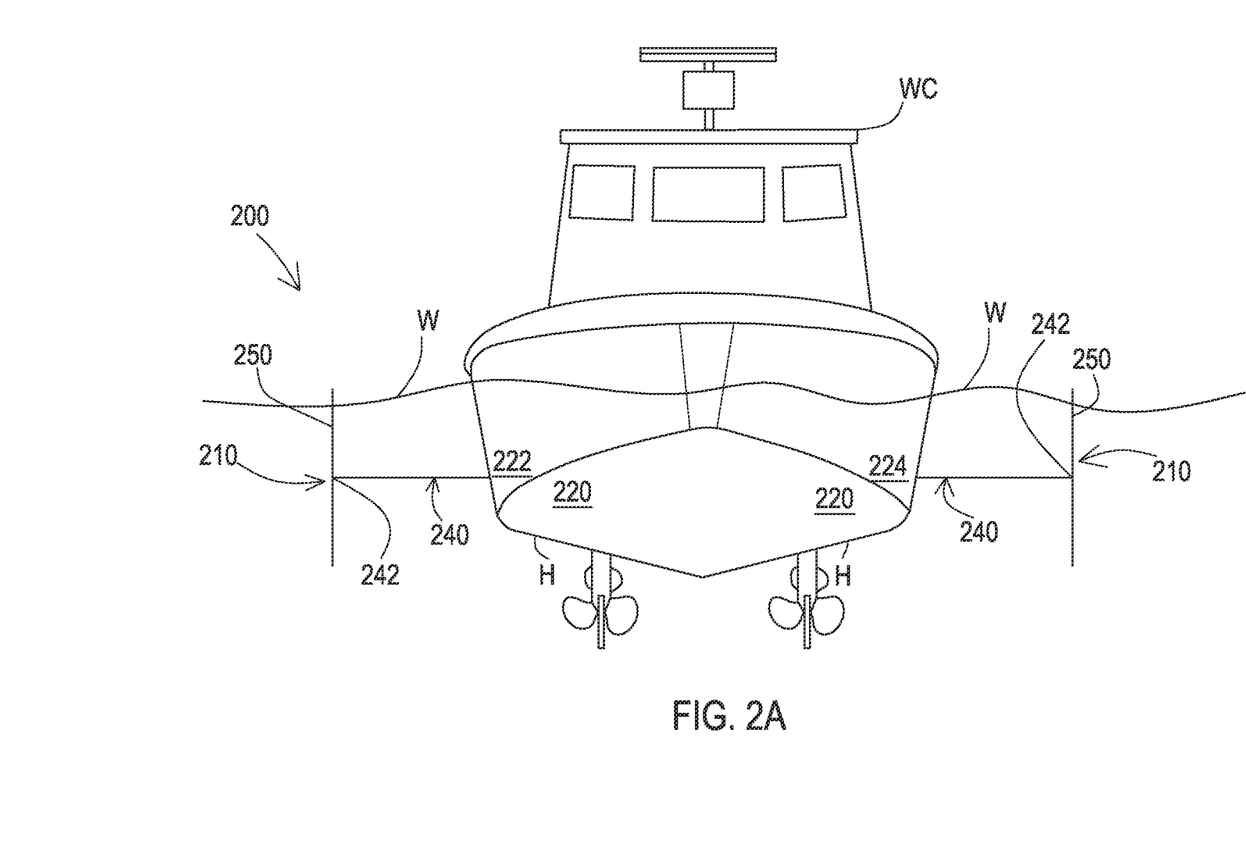
FIG. 2A illustrates a cross-sectional perspective view of a water wings device for watercraft attached to the sides of a watercraft, in accordance with one embodiment of the present invention.
Figure 2B:
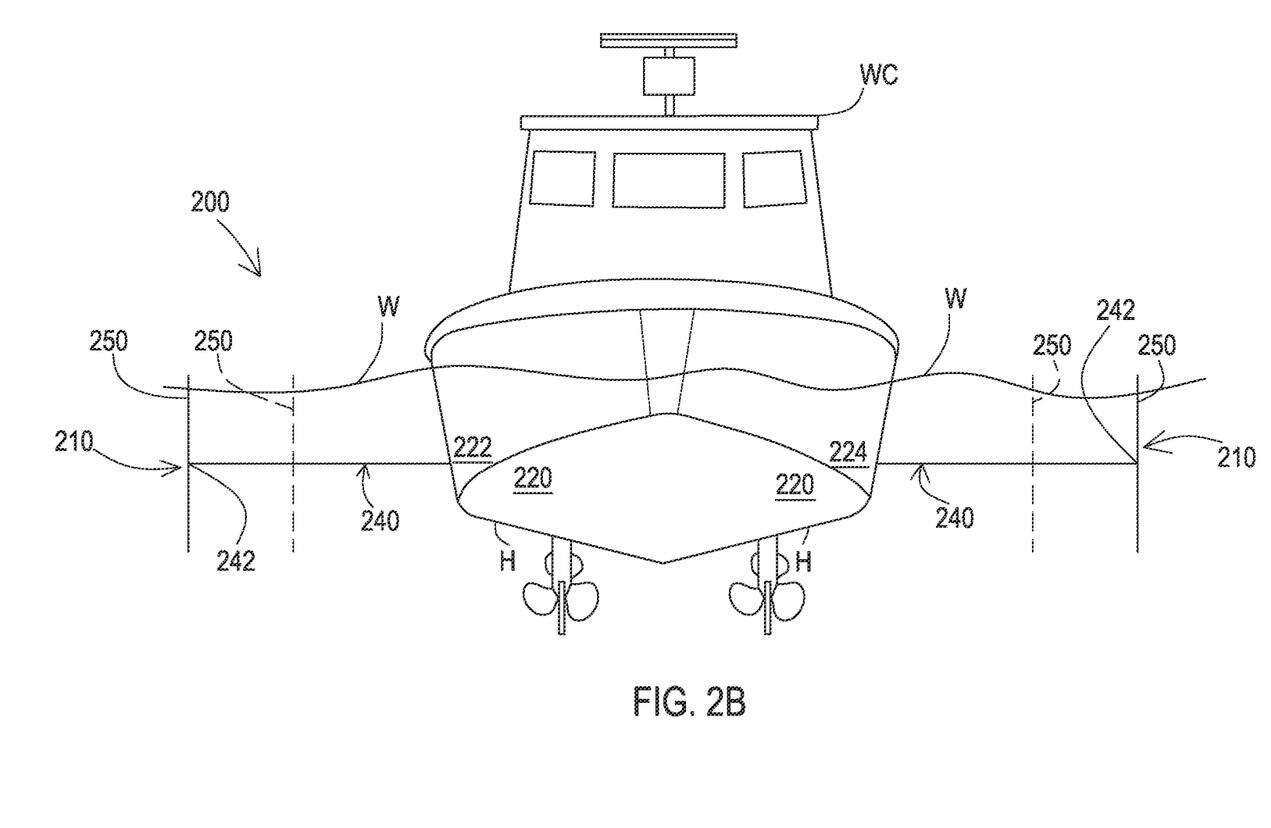
FIG. 2B illustrates a cross-sectional perspective view of a water wings device for watercraft attached to the sides of a watercraft with water wings extended, in accordance with one embodiment of the present invention.

FIG. 2A illustrates a cross-sectional perspective view of a water wings device for watercraft 200 attached to a watercraft WC, in accordance with one embodiment of the present invention. FIG. 2B illustrates a cross-sectional perspective view of a water wings device for watercraft 200 attached to a watercraft with two water wings 210 extended, in accordance with one embodiment of the present invention.

In another embodiment of the water wings device for watercraft 200, the water wings device for watercraft 200 is attached to the side of the watercraft WC. The water wings device for watercraft 200 includes a plurality of water wings 210 that are attached to a watercraft WC. The water wings 210 also include a directing fin 250 attached to each distal end 242 of the attachment arm 240 forming each water wing 210. The number of water wings 210 can be any number desired by a user, however only one water wing 210 is provided on each side 222,224 of the watercraft 220 as illustrated in FIGS. 2A and 2B. The attachment arm 240 can be extended as desired by a user, as is illustrated in FIG. 2B or can be stationary, as is illustrated in FIG. 2A. A directing fin 250 is attached to the distal end 242 of each attachment arm 240 that directs water in such a methodology that increases the watercraft's WC efficiency while the watercraft WC is traveling through the water. The water wings device for watercraft 200 also is made of material non-corrosive in water. The methodology of the directing fin 250 that increases the watercraft's WC efficiency is described subsequently after the FIG. 4A and FIG. 4B descriptions. Water W that the watercraft WC travels in and the hull H of the watercraft WC are also illustrated in FIGS. 2A and 2B.

Figure 2C:
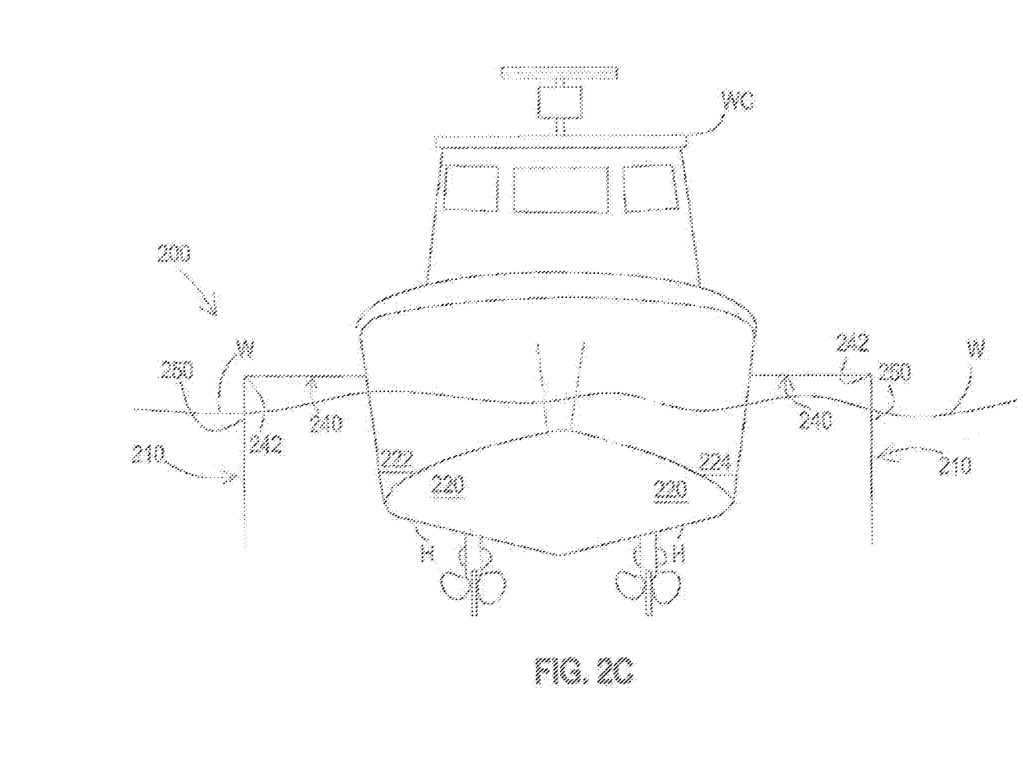
FIG. 2C illustrates a cross-sectional perspective view of a water wings device for watercraft attached to the sides of a watercraft by an attachment arm that is out of the water, in accordance with one embodiment of the present invention.

FIG. 2C illustrates a cross-sectional perspective view of a water wings device for watercraft 200 attached to the sides S of a watercraft WC by an attachment arm 240 that is out of the water W, in accordance with one embodiment of the present invention. With the attachment arm 240 being out of the water W, the water wings 210 are located in the water to decrease the drag of the watercraft WC.

Figure 2D:
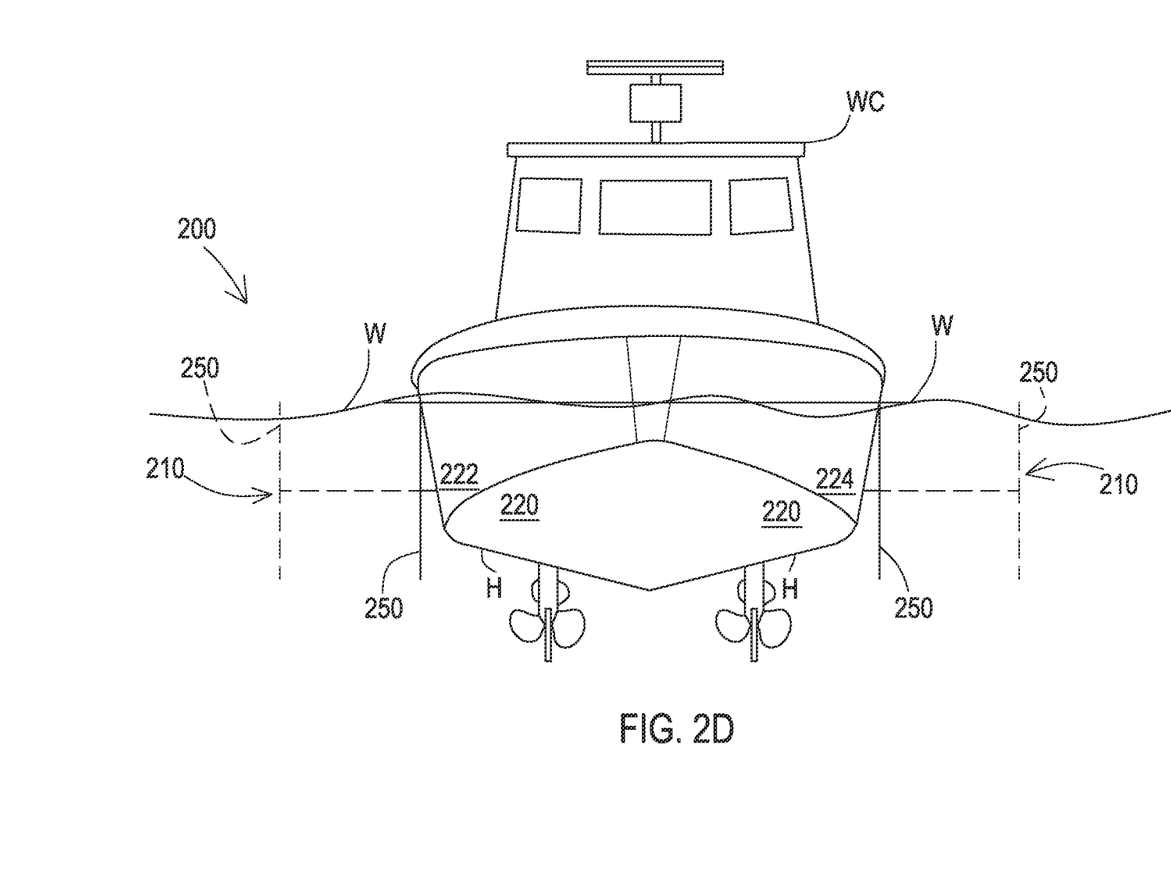
FIG. 2D illustrates a cross-sectional perspective view of a water wings device for watercraft when water wings are retracted in the hull of the watercraft, in accordance with one embodiment of the present invention.

FIG. 2D illustrates a side perspective view of a water wings device for watercraft 200 when water wings 210 are retracted in the hull H of the watercraft WC, in accordance with one embodiment of the present invention. The water wings 210 can be adjustably retracted and extended as desired by a user and can be retracted into the hull H of the watercraft WC if desired as well.

Figure 3:
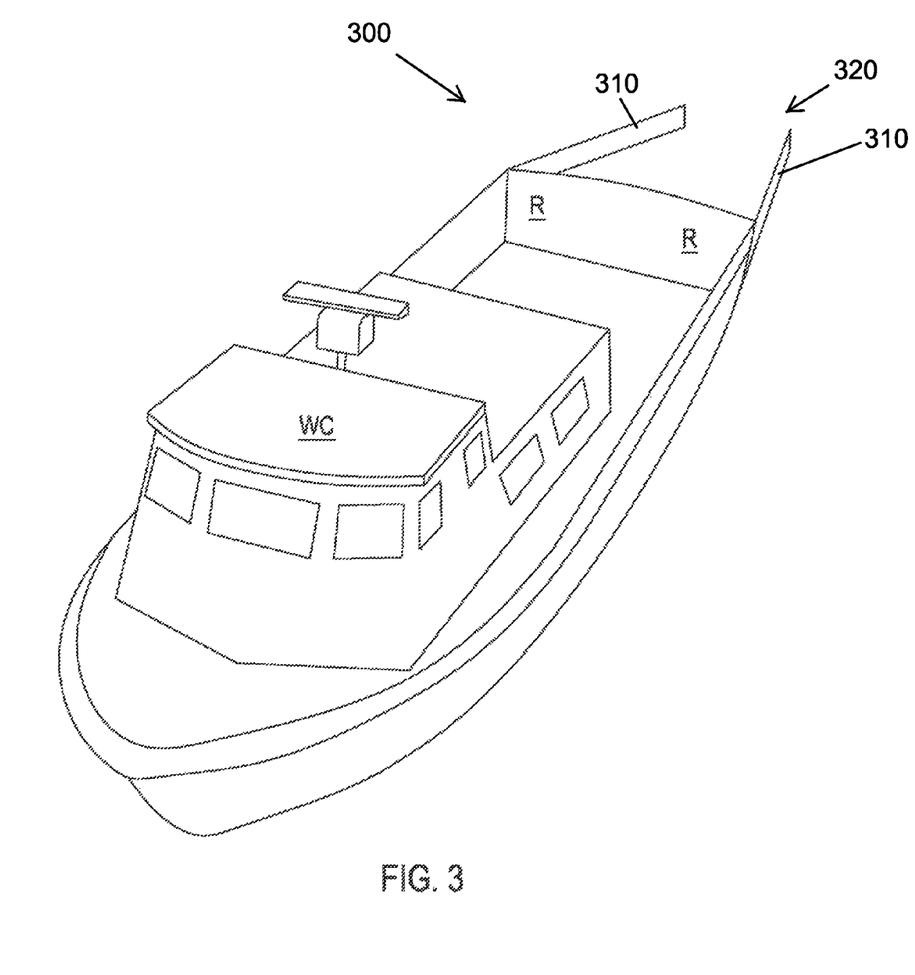
FIG. 3 illustrates a diagonal side overhead perspective view of a boat tail with a tapering protrusion, in accordance with one embodiment of the present invention.

FIG. 3 illustrates an overhead perspective view of a boat tail 300 with a tapered protrusion 320, in accordance with one embodiment of the present invention. The water wings device for watercraft includes a plurality of water tails 310 attached to the rear R of the watercraft WE that directs water W in such a methodology that increases the watercraft's WE efficiency while the watercraft WE is traveling through the water W. The tapered protrusion 320 is placed into water W the watercraft WE is traveling in and redirects the water W and destroys any water vortexes formed. The tapered protrusion 320 redirects a water vacuum that is created at the rear R of the watercraft WE and destroys the formed vacuum and displaces the water 10 vacuum created at the rear of the watercraft WE. The boat tail 300 with a tapered protrusion 320 is made of material non-corrosive to water. The boat tail 300 can also include a plurality of water wings (FIG. 1A, 110) each with an attachment arm (FIG. 1A, 120) with a distal end (FIG. 1A, 122) and a directing fin (FIG. 1A, 130), the directing fin (FIG. 1A, 130) attached to said each distal end (FIG. 1A, 122) of said each attachment arm (FIG. 1A, 120), said water wings (FIG. 1A, 110) attached to said sides of said watercraft, said directing fins (FIG. 1A, 130) placed into water said watercraft is traveling in, said water wings (FIG. 1A, 110) are a selected one of adjustably extended and retracted water wings and stationary water wings.

Figure 4A:
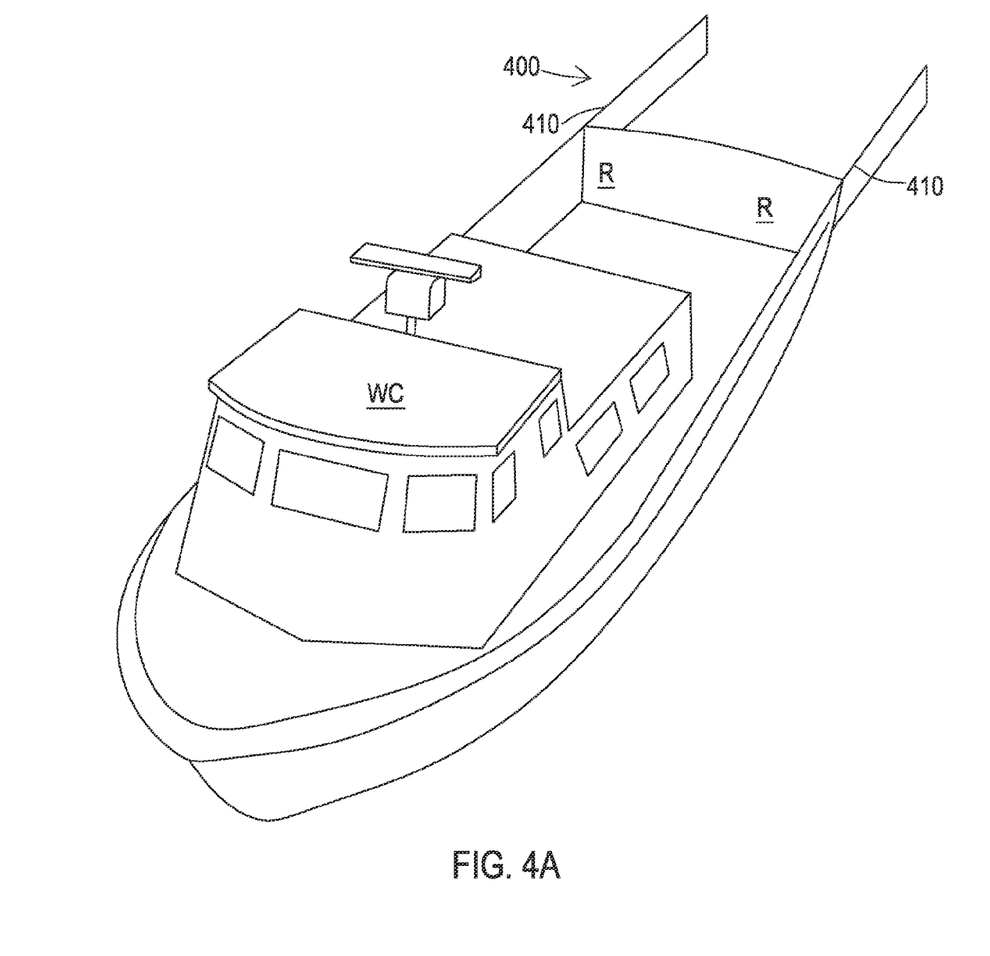
FIG. 4A illustrates a diagonal side overhead perspective view of a water wings device for watercraft attached to the rear of a watercraft, in accordance with one embodiment of the present invention.
Figure 4B:
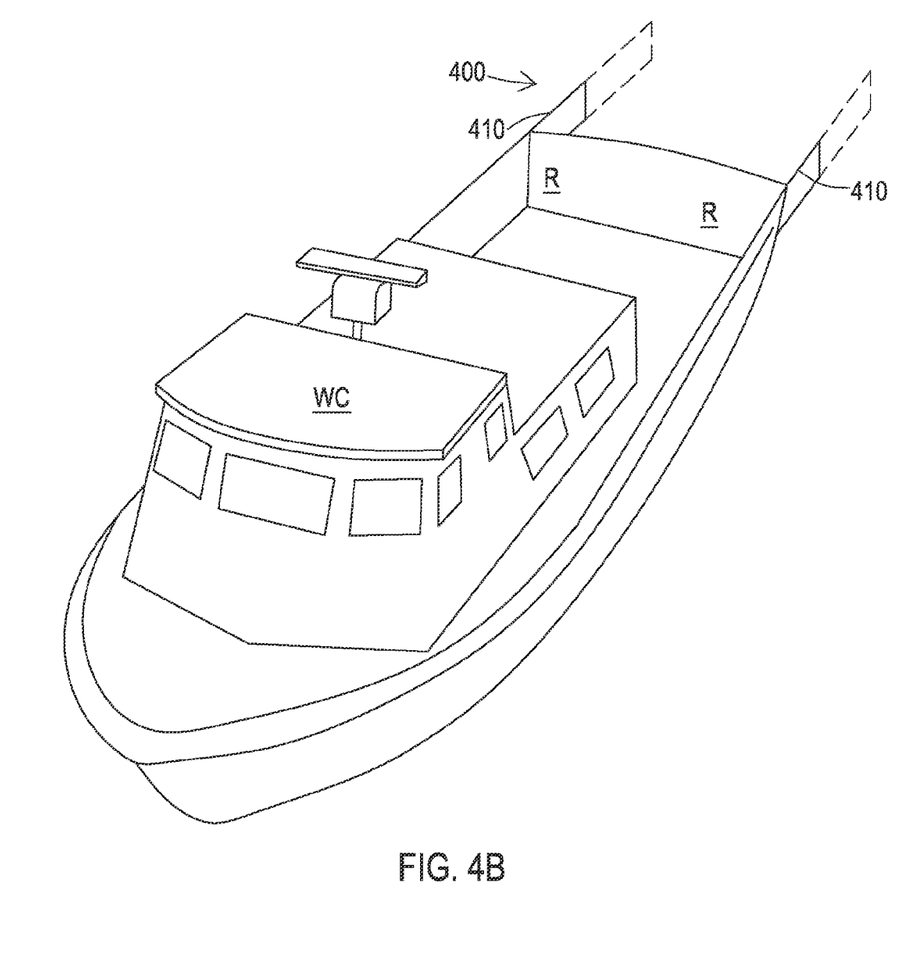
FIG. 4B illustrates a diagonal side overhead perspective view of a water wings device for watercraft attached to the rear of a watercraft with water wings extended, in accordance with one embodiment of the present invention.

FIG. 4A illustrates an overhead perspective view of a water wings device for watercraft 400 attached to the rear R of a watercraft WC, in accordance with one embodiment of the present invention. FIG. 4B illustrates an overhead perspective view of a water wings device for watercraft 400 attached to the rear R of a watercraft WC with water wings 410 extended, in accordance with one embodiment of the present invention.

In another embodiment of the water wings device for watercraft 400, the water wings device for watercraft 400 is attached to the rear R of the watercraft WC. The water wings device for watercraft 400 can be attached to the rear R of the watercraft WC. The water wings device for watercraft 400 includes a plurality of water tails 310, 410 attached to the rear R of the watercraft WC that directs water W in such a methodology that increases the watercraft's WC efficiency while the watercraft WC is traveling through the water W. The water tails 410 can be extended as desired by a user, as is illustrated in FIG. 4B or can be stationary, as is illustrated in FIG. 4A. The water wings device for watercraft 400 also is made of material non-corrosive in water. The methodology of the water tail 410 that increases the watercraft's efficiency is described subsequently after the FIG. 4A and FIG. 4B descriptions.

All embodiments of the water wings device for watercraft 100,200,300,400 reduce the drag of a watercraft WC through the water W and thereby improve the efficiency of the watercraft WC. A watercraft WC will get better gas mileage when using the water wings device for watercraft 100,200,300,400 due to the water wings 110,210 redirecting the water W off the sides S and rear R of the watercraft WC and destroying any water vortexes on the sides S of a watercraft WC and/or vacuum at the rear of a watercraft WC formed from movement of the watercraft WC through the water W. The water wings 110,210 are similar to the airplane winglets used on the end of airplane wings to minimize induced drag during flight. The application of a device similar to the water wings device for watercraft 100,200 has been used on aircraft but has not yet been applied to watercraft.

The water tail for watercraft 300,400 can be used on any type of watercraft WC to improve the watercraft's efficiency through the water W. The water tails 310, 410 are similar to the air foil tails used on the ends of trucks to minimize induced drag during travel on the roads. The application of a device similar to the air foil tail device for watercraft 300 has been used on motor vehicles but has not yet been applied to watercraft. The water tail for watercraft 300 can be used on any type of watercraft WC to improve the watercraft's efficiency through the water W.

As a watercraft WC goes through the water W, the hull H of the watercraft WC pushes water and increases the velocity of the water W near the watercraft WC. As the watercraft WC moves, water W that has velocity from the watercraft has less pressure near the watercraft WC versus the water W further away from the watercraft WC, having less velocity and thus higher pressure. The water wings device for watercraft 100, 200 separates the high pressure water, not moving, from low pressure water, that is moving, and separates the high pressure water from the low pressure water and prevents them from mixing together. This destroys the water vortexes or a drag component that would be otherwise formed and is present in the water while the watercraft WC is moving. The water tail 310, 410 displaces the vacuum that is created at the rear of watercraft WC, thus decreasing drag through water W by the watercraft WC.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In combination, a watercraft and a water wings device comprising:
    a watercraft having a hull and placed in a body of water;
    a water wing attached to each opposite side of an exterior surface of said hull, each water wing having an attachment arm including a proximal end attached to the corresponding exterior surface of the side of the hull, a distal end extending away from the hull, and a directing fin attached to each said attachment arm, said directing fins being attached substantially perpendicular to said attachment arms, and each said attachment arm extending substantially horizontally away from said hull and placed into water in which said watercraft is travelling; and
    a water tail attached to a rear of said hull, said water tail including a pair of protrusions each having a first end separated from one another and secured to opposite sides of said rear of said hull, said protrusions each further having a second end extending away from said hull and oriented to one another in a tapering configuration such that second ends are closer to one another than the first ends of said protrusions, each said protrusion further having an upper end, an opposite lower end, and a substantially flat surface extending between said upper and lower ends; and wherein each said protrusion is placed in the water substantially perpendicular to said flat surface.

2. The combination, as claimed in claim 1, wherein:
    each water wing is made of material noncorrosive in water.

3. The combination, as claimed in claim 1 wherein:
    each said fin has a substantially flat surface and placed in the water substantially perpendicular to said flat surface.

4. The combination, as claimed in claim 1, wherein:
    said protrusions of said water tail are movable between a first refracted position and a second extended position, said protrusions being extended in length in said second extended position.

5. The combination, as claimed in claim 1, wherein:
    each protrusion is made of material noncorrosive in water.

6. The combination, as claimed in claim 1, wherein:
    each water wing has a tapered forward edge and a tapered rear edge.

7. The combination, as claimed in claim 1, wherein:
    each water wing has a triangular shaped forward edge and a triangular shaped rear edge.

8. The combination, as claimed in claim 1, wherein:
    each water wing has a pointed shaped forward edge and a pointed shaped rear edge.

9. The combination, as claimed in claim 1, wherein:
    each water wing has a v-shaped forward edge and a v-shaped rear edge.

10. The combination, as claimed in claim 1, wherein:
    each water wing has a forward edge that is pointed as formed by corresponding converging sides, and a rear edge that is pointed as formed by corresponding converging sides.

11. The combination, as claimed in claim 1, wherein:
    each water wing has a forward edge and a rear edge, said forward and rear edges having similar pointed shapes that are different than a shape of a portion of said water wing between said forward and rear edges.

* * * * *

UNITED STATES PATENT AND TRADEMARK OFFICE
CERTIFICATE OF CORRECTION

PATENT NO.       : 8,967,069 B2                                    Page 1 of 1
APPLICATION NO.  : 13/005615
DATED            : March 3, 2015
INVENTOR(S)      : Jonathan Cole Harding It is certified that error appears in the above-identified patent and that said Letters Patent is hereby corrected as shown below:

In the Claims

Claim 4, Column 6, Line 10: DELETE "refracted" and INSERT -- retracted --

Signed and Sealed this
Sixteenth Day of June, 2015

Michelle K. Lee
*Director of the United States Patent and Trademark Office*